Aug. 31, 1965  E. J. RENNER  3,203,599
METERED VIBRATORY CONVEYOR
Filed June 17, 1963  2 Sheets-Sheet 1

INVENTOR.
ELMER J. RENNER
BY
Marshall, Wilson & Yeasting
~attorneys~

Aug. 31, 1965   E. J. RENNER   3,203,599
METERED VIBRATORY CONVEYOR

Filed June 17, 1963   2 Sheets-Sheet 2

INVENTOR.
ELMER J. RENNER
BY
Marshall, Wilson & Yeasting
-attorneys-

United States Patent Office 3,203,599
Patented Aug. 31, 1965

3,203,599
METERED VIBRATORY CONVEYOR
Elmer J. Renner, Aurora, Ill., assignor to Carrier Manufacturing Co., Jeffersonville, Ind., a corporation of Kentucky
Filed June 17, 1963, Ser. No. 288,112
5 Claims. (Cl. 222—196)

The invention relates to a metered vibratory conveyor of the type that comprises a screw conveyor in which vibration is used to facilitate the flow of material.

United States Patents Nos. 2,800,252 and 2,957,608 disclose an apparatus comprising a screw conveyor, in which the entire screw conveyor assembly is movably mounted with respect to a base and is vibrated with respect to the base. In this type of apparatus, the screw or auger is simultaneously vibrated and rotated, the vibration being relatively rapid and the rotation being relatively slow. At any given moment, one part of a flight of the auger may extend substantially parallel to the direction of the vibratory movement and another part of the flight of the auger may extend substantially perpendicular to the direction of the vibratory movement.

It has now been found that apparatus of the type disclosed in these two prior patents has certain serious disadvantages. One disadvantage arises from the fact that at any given moment a part of the flight of the auger may extend substantially perpendicular to the direction of vibratory movement so that the vibratory movement causes such part of the flight to impact or slap against the material being conveyed. When the material is tacky, the slapping of a portion of the flight of the auger against the material which results from the vibratory movement of the auger tends to cause the tacky material to adhere to the auger. Then as the auger rotates, successive portions of the auger are presented at right angles to the direction of vibratory movement, and the resultant slapping of the successive portions of the auger against the tacky material causes the material to adhere and build up on successive portions of the auger. As this process continues, the spaces between the flights of the auger gradually fill up with the tacky material until the apparatus finally becomes inoperative to convey the material.

The principal object of the invention is to provide a novel type of metered vibratory conveyor which has a number of important advantages over the known vibratory screw conveyors. More specific objects and advantages are apparent from the description, in which reference is had to the accompanying drawings.

In accordance with the present invention, an auger is rotatably mounted on a base, and a conduit which surrounds at least the lower portion of the auger is movably mounted on the base independently of the auger, so that the conduit may be vibrated relative to the base while the auger is rotated without being vibrated. The present invention thus provides the advantages of freedom and smoothness of flow that are obtained by vibrating the screw conveyors in the prior devices, and at the same time causes the auger to be rotated without being vibrated. It has been discovered that when the auger is rotated without being vibrated, in accordance with the present invention, a tacky material does not tend to adhere and build up on the flights of the auger, because the auger is not being slapped against the tacky material by vibratory movement.

In the practice of the present invention, a further important advantage may be achieved if the vibratory movement of the conduit which surrounds at least the lower portion of the auger is of such a nature as to convey or feed the material along the conduit. In that case, the auger may be rotated at such a rate that the speed of the linear forward movement of the flights of the auger is substantially equal to the speed at which the vibration of the conduit tends to move the material along the conduit. By thus synchronizing the linear forward movement of the flights of the auger with the forward movement that is produced by the vibratory movement of the conduit, a remarkable improvement is produced in the smoothness with which the material flows along the conduit, and the apparatus may be designed to convey the material at a rate substantially greater than the maximum rate could be obtained by the use of any of the known vibratory screw conveyors in which the auger is both rotated and vibrated.

In an apparatus embodying the present invention, synchronization of the linear forward movement of the flights of the auger with the forward movement of the material that is produced by the vibration of the conduit is possible only because the auger in the present apparatus is rotated without being vibrated. The movement of the material in the conduit that is produced by vibration of the conduit in the present apparatus is a substantially steady forward movement. The linear movement of the flights of the auger could not be synchronized with the substantially steady forward movement of the material that is produced by the vibration of the conduit if the auger were vibrated during its rotation, because vibration of the auger during its rotation would result in pulsating forward movement of the flights of the auger rather than the steady forward movement of the flights.

Figure 1:
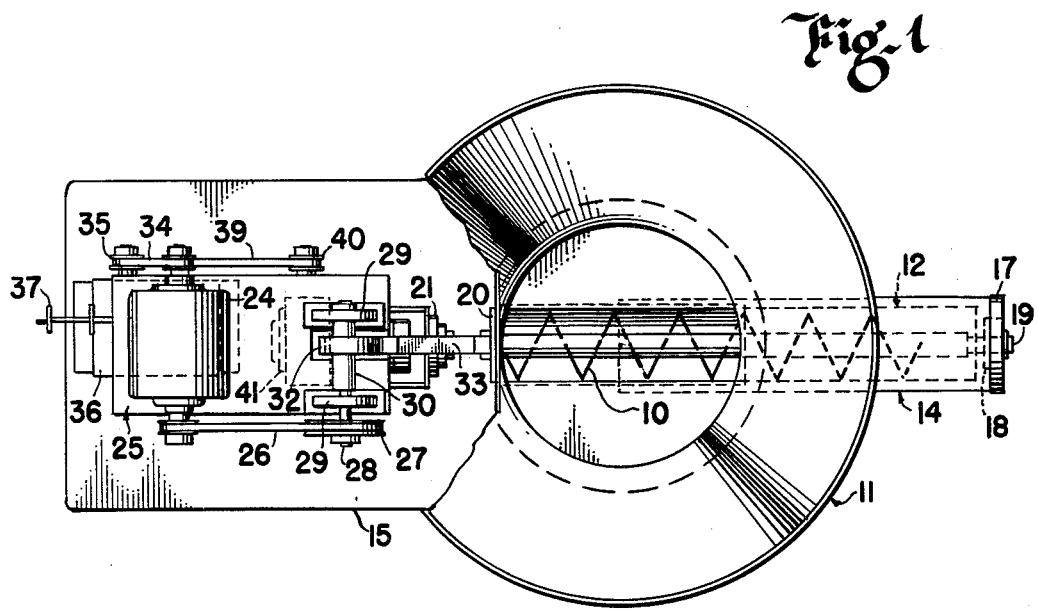
FIG. 1 is a plan of a preferred form of apparatus embodying the invention, with a portion of the hopper broken away.
Figure 2:
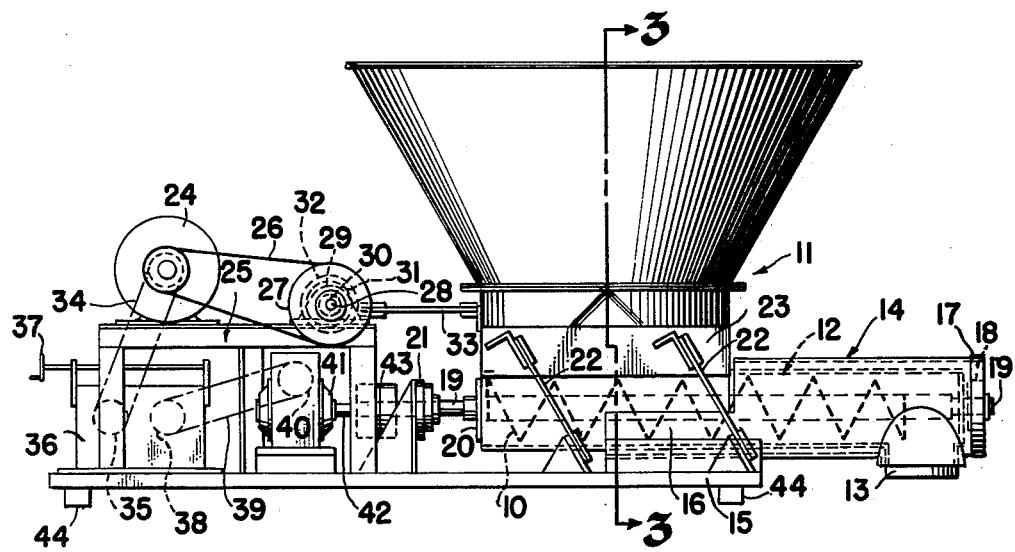
FIG. 2 is an elevation of the apparatus.
Figure 3:
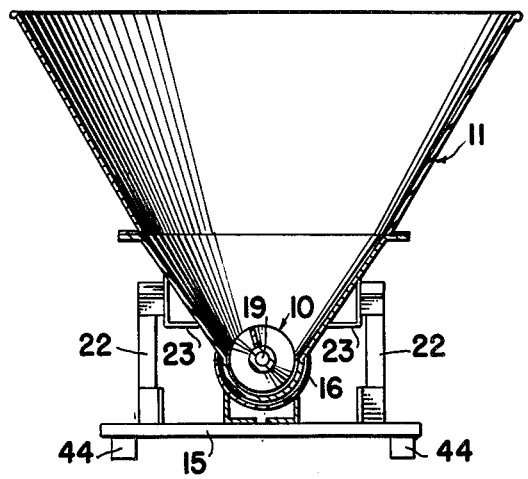
FIG. 3 is a vertical section taken on the line 3—3 of FIG. 2.

These specific drawings and the specific description that follows are intended to disclose and illustrate and not to limit the invention.

The apparatus of the present invention comprises an auger having its axis at an angle to the vertical. Although the axis of the auger may be inclined to the horizontal, the axis of the auger is usually horizontal or only slightly inclined to the horizontal.

In an apparatus embodying the invention, at least the lower portion of the auger is surrounded by a casing or conduit extending along at least part of the length of the auger. This casing or conduit, for example, may be a trough which has a U-shaped cross section and which is either open or closed at the top.

The preferred form of apparatus shown in the drawings includes a screw conveyor that comprises an auger 10, part of which extends through a lower portion of a supply hopper 11 and the remainder of which is surrounded by a casing 12 which in this case is cylindrical. The casing 12, which is integral with and forms an extension of the hopper 11, is provided with a spout 13 through which the conveyed material is discharged from the apparatus. Although the spout 13 discharges the material radially downward, it is to be understood that the material may be discharged axially.

An outer sleeve 14, which surrounds the casing 12, is mounted on the base 15 by means of a rearward extension 16 of the lower part of the outer sleeve 14.

The forward end of the outer sleeve 14 is closed by means of a cap 17, in the center of which is fixed a bearing 18 which supports the front end of the shaft 19 on which the auger 10 is mounted. The rear end of the auger shaft 19 extends through a flexible seal 20 in the rear end of the hopper 11 and is supported in a bearing bracket 21 mounted on the base 15.

The supply hopper 11 and the casing 12 which is integral therewith are supported by means of four leaf springs 22 which have their lower ends secured to the base 15 and have their upper ends secured to two side brackets 23 on the hopper 11. These leaf springs, which may be of any suitable spring material, such as steel or laminated glass fiber, are inclined slightly to the vertical. Thus as the leaf springs 22 are flexed, the supply hopper 11 and the attached casing 12 move through a substantially linear path which extends at an acute angle to the axis of the auger 10. Leaf springs, however, are only one example of a support for mounting these parts for movement in an elongated path.

Power for vibrating the supply hopper 11 and casing 12 is supplied from a motor 24 which is mounted on a table-like frame 25 erected on the base 15. The motor 24, by means of a belt 26, drives a rotary driving member consisting of a pulley 27 fixed on a shaft 28. The shaft 28, which is journaled in a pair of bearing blocks 29 mounted on the frame 25, constitutes part of a rotary eccentric drive. The shaft 28 has an eccentric central portion 30 on which is journaled a bearing 31 that is fixed in a drive collar 32 secured to the rear end of a leaf spring 33. The front end of the leaf spring 33 is secured to the rear end of the hopper 11, so that the leaf spring 33 constitutes a positive reciprocatory driving member coupling the rotary eccentric drive to the hopper which translates the orbital motion of the rotary eccentric drive into vibratory motion of the hopper 11 and casing 12. The leaf springs 22 which support the hopper 11 are flexed during such vibratory motion, and these leaf springs determine the path through which the hopper 11 and casing 12 are vibrated.

The motor 24, acting through a second belt 34, drives the input pulley 35 of a variable speed drive 36. The variable speed drive 36 is provided with a hand wheel 37 for adjusting the speed ratio between the input pulley 35 and the output pulley 38 of the variable speed drive. In order to provide a rotary drive for rotating the auger in a direction so as to move the material toward the discharge end of the casing 12, the output pulley 38 of the variable speed drive 36, by means of a belt 39, drives the input pulley 40 of a worm gear drive 41. The output shaft 42 of the worm gear drive 41 is coupled by means of a flexible coupling 43 to the rear end of the shaft 19 on which the auger 10 is mounted. In this manner the motor 24 supplies power also for rotating the auger 10, and the variable speed drive 36 permits the speed of rotation of the auger to be varied.

It is to be understood that suitable means are to be provided for supplying material to the hopper 11 so as to maintain a supply of material in the hopper.

In the apparatus shown in the drawings, the supply hopper 11 is restrained longitudinally by the leaf spring 33, so that the supporting function of the leaf springs 22 could be performed by replacing each of the leaf springs 22 with a strut that is pivoted at its top to a side bracket 23 and at its bottom to the base 15. However the leaf springs 22, in addition to supporting the hopper 11 and casing 12 and guiding their vibratory movement, perform an important additional function in that they resiliently urge these parts toward an intermediate position in their path of vibratory movement. This makes it possible to tune the system consisting of the leaf springs 22 and the mass supported thereon (including a normal load of material) in such a manner that the natural frequency of vibration of the system is the same as the frequency at which the system is vibrated by the rotary eccentric drive with the motor 24 operating at its normal speed. Then when the system is vibrating at its natural frequency on the springs 22, the system draws only enough power from the rotary eccentric drive to overcome frictional losses, so that the rotary eccentric drive imposes only a relatively small load upon the motor 24.

In the apparatus shown in the drawings, the rotary eccentric drive is mounted independently of the hopper 11 and casing 12, and the coupling of the rotary eccentric drive to the hopper 11 by means of a positive reciprocatory driving member precisely fixes the amplitude of vibration of the hopper 11 and casing 12. As a result, an increase in the weight of material carried by the system does not cause damping of the vibration, and the throughput of the apparatus may be precisely controlled by controlling the frequency of vibration and the speed of rotation of the auger.

In the interest of simplicity, a relatively small apparatus is shown in the drawings. Such a relatively small apparatus is useful primarily as a "feeder" for feeding a particulate material at a precisely controlled rate, rather than merely conveying the material from one point to another. In the case of a relatively large conveyor embodying the invention, a fixed throughput may be desired so that a constant speed drive may be used to rotate the auger.

The rotary eccentric drive shown in the drawings has been selected to illustrate the invention because of its simplicity, and may be replaced by various other rotary eccentric drives, including the known types of drives which incorporate balancing arrangements for confining the vibratory forces to the vibratory system so as to avoid imparting vibrations to the building in which the system is housed. In the apparatus shown in the drawings, the base 15 is mounted on rubber feet 44 which substantially absorb the vibrations.

In the apparatus shown in the drawings, the vibratory movement of the hopper 11 and the casing or conduit 12 is of such a nature as to convey or feed the material forward. In order to cause the material to flow through and out of the conduit 12 at the maximum rate, the variable speed drive 36 is adjusted by means of the hand wheel 37 to cause the auger to rotate at such a rate the speed of the linear forward movement of the flights of the auger is substantially equal to the speed at which the vibration of the conduit 12 tends to move the material along the conduit. Under these conditions, the volume of material flowing through the conduit 12 is very large because the linear forward movement of the flights of the auger is synchronized with the forward movement which is imparted to the material in the conduit by the vibration of the conduit.

The apparatus shown in the drawings may be used to feed material at a precisely controlled rate, for example in a chemical manufacturing process. Thus when the speed of rotation of the auger 10 has been set to cause the material of flow through the conduit 12 at the maximum rate, as hereinbefore described, the rate of flow of the material through the conduit may be reduced to any desired value by reducing the speed of the auger by means of the adjustment provided by the variable speed drive 36.

Figure 4:
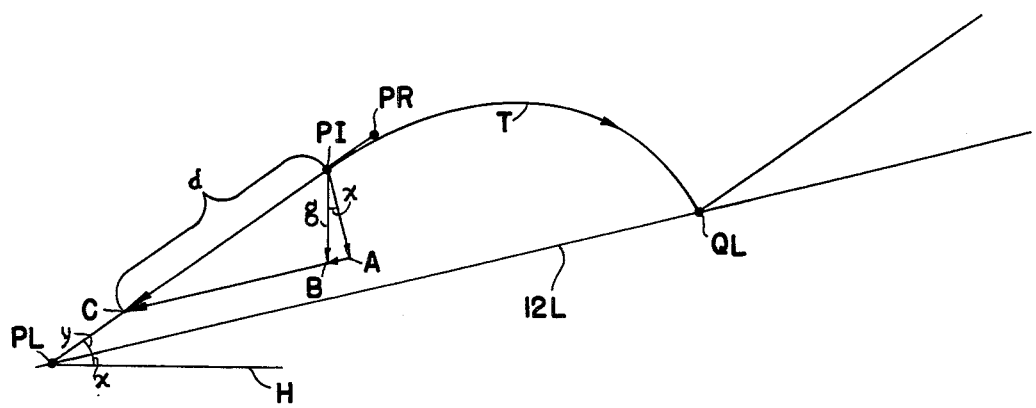
FIG. 4 is a diagram illustrating the motion that may be imparted to the material by vibratory movement of the apparatus.

FIG. 4 illustrates the motion which the vibratory movement of the hopper 11 and conduit 12 tends to impart to a particle of material in the apparatus. It should be noted that FIG. 4 represents the case in which the conduit or casing of the screw conveyor in the present apparatus and the axis of the auger are inclined upward toward the right, the angle of inclination from the horizontal being shown in FIG. 4 as the angle $x$.

In FIG. 4 the line 12L represents the extreme left-hand position that is occupied by the bottom of the conduit or casing of the screw conveyor at the instant when the conduit is at the left-hand extremity of its vibratory movement. Thus the line PL–PR represents the path of vibratory movement of a point on the bottom of the conduit of the screw conveyor. As this point travels through such path from left to right during the vibratory movement of the conduit, a particle of material resting on the bottom of the conduit at this point tends to travel through the same path. However, as the conduit approaches the right-hand extremity of its vibratory movement, its upward movement is decelerating. If the deceleration of the upward movement of the conduit is great enough relative to the downward acceleration of a particle resting on the bottom of the conduit that is produced by the force of gravity acting upon the particle, the conduit will be decelerated and stopped so quickly at the right-hand extremity of its vibratory movement that the force of gravity acting on the particle will not cause the particle to remain in contact with the bottom of the conduit, and the particle will in effect become a projectile traveling through the air in a trajectory such as that indicated as T in FIG. 4.

FIG. 4 includes a vector diagram in which the vector PI–B represents the downward acceleration $g$ produced by the force of gravity acting upon a particle of material resting on the bottom of the conduit at the instant when the particle is at the position PI. The deceleration $d$ of the conduit may be resolved into a component PI–A perpendicular to the bottom of the conduit and a component A–C parallel to the bottom of the conduit. The inertia of the particle at the position PI tends to keep the particle moving in the direction PI–PR and at the velocity at which the particle is traveling at the position PI. Thus the component A–C parellel to the bottom of the conduit is the component of the deceleration $d$ which tends to cause the inertia of the particle to slide the particle forward along the conduit, and the component PI–A perpendicular to the bottom of the conduit is the component of the deceleration $d$ which tends to cause the inertia of the particle to lift the particle out of contact with the conduit.

The acceleration $g$ produced by the force of gravity acting upon the particle at the position PI may be resolved into a component PI–A perpendicular to the bottom of the conduit which tends to keep the particle in contact with the conduit and a component A–B parallel to the bottom of the conduit which tends to cause the particle to slide backward along the inclined bottom of the conduit.

In the case illustrated in FIG. 4, the component PI–A of the acceleration $g$ produced by the force of gravity at the instant when the particle is at the position PI coincides exactly with the corresponding component of the deceleration of the conduit, i.e., $g \cos x$ equals $d \sin y$. Thus the pressure of the particle against the conduit is zero at the position PI. Then as the conduit continues to travel toward the right during its vibratory movement, the deceleration of the conduit will increase until it reaches a maximum $d_{max.}$ at the instant when the conduit reaches the right-hand extremity of its stroke. Accordingly, after the particle has moved to the right of the position PI the downward acceleration produced by gravity will not cause the particle to remain in contact with the bottom of the conduit.

In the case illustrated in FIG. 4, the conditions are such that the particle after passing the position PI will travel through the trajectory T, and the impact of the particle on the bottom of the conduit at the position QL will occur at the instant when the bottom of the conduit has reached the position 12L at the lefthand extremity of its vibratory movement. Immediately after the particle strikes the bottom of the conduit at the position QL, it will remain on the bottom of the conduit while the conduit executes the initial part of its succeeding movement toward the right and will be subjected to forces similar to those to which it was subjected during the preceding stroke, so that the particle then will follow a path as indicated in FIG. 4 which is similar to the path that the particle followed in traveling from the position PL to the position QL. In the case illustrated in FIG. 4 it is assumed that there is no bouncing or slipping of the particle on the bottom of the conduit.

The deceleration $d_{max.}$ which is attained at the instant when the conduit reaches the right-hand extremity of its stroke may be computed in inches per second per second from the equation $$d_{max.} = 19.74 f^2 s$$

in which $f$ is the frequency of vibration in cycles per second and $s$ is the stroke (for example, PL–PR) in inches.

The foregoing explanation of the vector diagram in FIG. 4 shows that a particle resting on the bottom of the conduit will not leave the bottom of the conduit unless $d_{max.} \sin y$ is greater than $g \cos x$. However, $\sin y$ is equal to $\cos x$ when $x+y=90°$, so that $\sin y$ cannot be greater than $\cos x$ unless $x+y$ is greater than $90°$. Yet $x+y$ must always be less than $90°$ in the case in which the path of vibratory movement extends at an angle to the vertical. In that case $\sin y$ is always less than $\cos x$; also if $d_{max.}$ is equal to $g$, $d_{max.} \sin y$ is less than $g \cos x$ so that the vibratory movement of the conduit will not cause a particle resting on the bottom of the conduit to leave the bottom of the conduit.

However, it is not necessary that a particle resting on the bottom of the conduit actually leave the bottom of the conduit as the conduit approaches the end of its forward vibratory stroke, because of the slippage of particles resting on the bottom of the conduit which occurs as the deceleration of the conduit approaches a maximum near the end of the forward vibratory stroke of the conduit. As illustrated in FIG. 4, this slippage occurs because of the fact that the component A–C of the deceleration of the conduit is much greater than the component A–B of the acceleration caused by the force of gravity acting on a particle. Neglecting friction, it is evident that a particle on the bottom of the conduit at the position PI actually will be sliding forward because the backward component A–C of the deceleration of the conduit is much greater than the backward component A–B of the acceleration produced by the force of gravity acting on the particle. Even in the extreme case in which $d_{max.}$ does not exceed $g$, the component A–C (which is equal to $d_{max.} \cos y$) is greater than the component A–B (which is equal to $g \sin x$), when $\sin x$ is less than $\cos y$.

It should be noted also that the deceleration of the conduit as it approaches the end of its forward stroke tends to counteract the force of gravity and thus tends to reduce the pressure of the particle against the bottom of the conduit so as to reduce friction and enable the particle to slide forward along the conduit under the influence of the component A–C of the deceleration of the conduit which exceeds the component A–B of the acceleration of gravity.

On the other hand, during the second half of the backward stroke of the conduit, the deceleration of the conduit is in the opposite direction and thus adds to the pressure of a particle against the bottom of the conduit that is caused by the force of gravity. Thus the particle, which is allowed to slide forward near the end of the forward stroke of the conduit, is held tightly against the conduit near the back end of the stroke and is prevented from sliding backward under the action of the forces prevailing near the back end of the stroke. The forward slippage of particles on the bottom of the conduit which is thus permitted near the end of the forward stroke, while backward slippage is prevented near the back end of the stroke, is obtained even when the deceleration of the conduit is not great enough to permit the particles to travel through the air in a trajectory such as the trajectory T in FIG. 4.

In order to obtain the greatest improvement in the practice of the invention, it is preferable that the axis of the auger be generally horizontal and that the vertical component ($d_{max.} \sin x+y$) of the maximum acceleration $d_{max.}$ of the conduit be greater than the acceleration of gravity.

In order to produce the best results, the angle $y$ should be at least $5°$. The preferred range for the angle $y$ is from 10° to 30°. However, the angle $y$ may be as great as 40°, and $x+y$ may be as great as 80°. On the other hand, the axis of the auger may be inclined downward from the horizontal, the angle of inclination preferably being less than 45°.

In any case, it is desirable that the vibration of the casing or conduit of the screw conveyor in an apparatus embodying the invention consist of a vibratory movement in an elongated path extending at an acute angle to the axis of the auger, so that the vibratory movement may be used to propel the particles in the manner illustrated in FIG. 4. The path of vibration may be elliptical but preferably is substantially linear. In order that the vibratory movement of the conduit may effectively propel the particles of material in the screw conveyor, the frequency of vibration of the conduit should be not more than 2000 cycles per minute, and the speed of rotation of a rotary eccentric drive which produces the vibration should be not more than 2000 r.p.m. Also, in order that the vibratory movement may effectively propel the particles, it is necessary that the conduit of the screw conveyor be vibrated with a maximum acceleration ($d_{max.}$) at least substantially as great as the acceleration of gravity, i.e., the path of vibration must be of a particular minimum length ($s$) which depends upon the frequency of vibration. Such minimum length of the path of vibration or stroke in a case such as that illustrated in FIG. 4 may be computed in inches from the above equation $$d_{max.} = 19.74 f^2 s$$

in which the value of $d_{max.}$ is at least substantially as great as the acceleration of gravity ($g$), which is normally about 386 inches per second per second. In this equation the value of $f$ will be not more than 33⅓ cycles per second, which is equivalent to the maximum value of 2000 cycles per minute hereinbefore mentioned.

In the apparatus shown in the drawings, the vibratory stroke is of a definite length which is determined by the eccentricity of the rotary eccentric drive. The use of a vibratory movement having a frequency of not more than about 2000 cycles per minute and a stroke long enough so that the maximum acceleration of the conduit is at least substantially as great as the acceleration of gravity is particularly important for providing effective propulsion of the material in the conduit because of the confined nature of the spaces in which the material is held between the flights of the auger, and because of the nonfree flowing nature of the materials which are customarily transported in this type of apparatus.

Preferably a rotary eccentric drive in an apparatus embodying the invention is operated at a relatively low speed so as to make it possible to employ a relatively long vibratory stroke, ranging from 3/16 inch to 1 inch. For example, the apparatus may be vibrated with a stroke of ½ inch at a frequency as high as 900 cycles per minute or as low as 400 cycles per minute. The conduit of a large conveyor embodying the invention may be vibrated with a stroke of 1 inch at a frequency as high as 600 cycles per minute or as low as 300 cycles per minute.

It will be understood that as the conduit travels through its forward vibratory stroke, its velocity reaches a maximum at the middle of the stroke. Then if the deceleration of the conduit is great enough, the particles resting on the bottom of the conduit may leave the bottom of the conduit with a forward velocity which is greater than the average velocity of the conduit. Thus the distance that a particle travels between the point where it leaves the bottom of the conduit and the point where it returns to the bottom of the conduit may be greater than the vibratory stroke of the conduit. In a typical case, the average rate at which a particle is propelled along the conduit by the vibration alone may be equal to $2fs \cos y$.

The effect that is obtained in the practice of the invention from the vibratory movement of the conduit makes it possible to rotate the auger at a relatively high speed. Preferably the linear speed of the flights of the auger is not less than about $1.5 fs \cos x+y$ and is not more than about $3fs \cos x+y$.

If the linear speed of the flights of the auger is $2fs \cos y$, such linear speed may approximate the average speed at which the particles are propelled along the conduit by the vibratory movement so that the forward movement of the flights of the auger is synchronized with the forward movement of the particles that is produced by the vibration of the conduit. Under these conditions, there is relatively little pressure of the auger against the material in the conduit because the vibration of the conduit is causing the material to move forward at a speed equal to the linear forward speed of the flights of the auger. This advantageous effect is obtained in the present apparatus because the auger is rotated without being vibrated.

In the vibratory screw conveyors heretofore known, the auger is both rotated and vibrated. When the auger is both rotated and vibrated, the flights of the auger cannot move smoothly along with a flow of material that is produced by vibration of the conduit, because during a portion of each cycle of the vibratory movement of the auger, parts of the flights of the auger are actually being slapped backward against the material. In contrast, the auger in the present apparatus is rotated without being vibrated, so that the movement of the flights of the auger in the present apparatus is a smooth and continuous forward movement.

When the continuous forward movement of the flights of the auger in the present apparatus is synchronized with the forward movement of the material that is produced by the vibration of the conduit, the contact between the flights of the auger and the material in the present apparatus is purely a sliding contact, without the slapping of the auger against the material which occurs in the known vibratory screw conveyors. The important advantage of a sliding contact between the auger flights and the material over the slapping contact which occurs in the known vibratory conveyors can be demonstrated graphically in the case of a tacky material. Thus when a blade such as a spade is thrust longitudinally into a mass of putty-like material, the spade can be withdrawn from the material without great difficulty; however, if the spade is slapped against the mass of tacky material it adheres tenaciously.

The sliding contact between the auger and the material in the vibratory conduit which is obtained in the practice of the invention is important in preventing a tacky material from adhering to the auger, and such sliding contact actually has the effect of continuously wiping the auger clean.

A material that consists of tacky particles cannot be conveyed in a simple vibratory conveyor which consists merely of a vibratory conduit without an auger, because the tacky particles as they are conveyed by such a simple vibratory conveyor will gradually build up in a thicker and thicker layer on the interior of the conduit until finally the conduit is completely choked with a solid mass of the tacky particles. When the present apparatus is used to convey a material consisting of tacky particles, the particles will also build up a layer on the interior of the vibratory conduit, but the auger in the present apparatus constantly shears off the built-up layer so that the thickness of the layer of tacky particles adhering to the interior of the conduit never attains a value at any point which is greater than the minimum clearance between the auger and the interior of the conduit. At the same time the auger in the present apparatus keeps itself clean and free of adhering particles because of the sliding contact between the auger and the material. It also has been observed that when an apparatus embodying the invention is being used to feed or convey a material consisting of tacky particles, the vibratory movement of the conduit is essential to keep the particles moving, and if the vibratory movement of the conduit is stopped the conduit will soon become jammed with the tacky material so as to stall the auger.

Having described the invention, I claim:

1. A metered vibratory conveyor comprising, in combination, an auger which is rotatably supported in bearings fixed to a base and has its axis at an angle to the vertical, a conduit which extends along at least the lower portion of the auger throughout at least part of the length of the auger and which is mounted on the base for vibratory translation relative to the base, a vibratory drive for producing such vibratory translation of the conduit, and a rotary drive for rotating the auger to produce a metered flow of material along the conduit.

2. A metered vibratory conveyor as claimed in claim 1 wherein the upper portion of the conduit is closed along part of the length of the auger.

3. A metered vibratory conveyor comprising, in combination, an auger which is rotatably mounted on a base and has its axis at an angle to the vertical, a conduit which encloses at least the lower portion of the auger along at least part of the length of the auger and which is mounted on the base independently of the auger for movement in an elongated path extending at an angle to the vertical and at an acute angle to the axis of the auger, a rotary driving member having an operating speed not greater than about 2000 r.p.m., a rotary eccentric drive which is operated by the rotary driving member at such operating speed to vibrate the conduit along such path with a maximum acceleration at least substantially as great as the acceleration of gravity, and a rotary drive for rotating the auger to move the material along the conduit in the direction in which the vibration tends to move the material.

4. A metered vibratory conveyor as claimed in claim 3 wherein the axis of the auger is generally horizontal, the vertical component of the maximum acceleration of the conduit is more than the acceleration of gravity, and the linear speed of the flights of the auger is from one and one-half to three times the product of the frequency of vibration of the conduit times the length of the horizontal component of its vibratory movement.

5. A metered vibratory conveyor comprising, in combination, an auger which is rotatably mounted on a base and has its axis at an angle to the vertical, a conduit which encloses at least the lower portion of the auger along at least part of the length of the auger and which is mounted on the base independently of the auger for movement in an elongated path extending at an angle to the vertical and at an acute angle to the axis of the auger, a rotary driving member having an operating speed not greater than about 2000 r.p.m., a rotary eccentric drive which is mounted independently of the conduit and is operated by the rotary driving member at such operating speed, a positive reciprocatory driving member coupling the rotary eccentric drive to the conduit, which translates the orbital motion of the rotary eccentric drive into vibratory motion of the conduit along such path, the maximum acceleration of the conduit during such vibratory motion being at least substantially as great as the acceleration of gravity, and a rotary drive for rotating the auger to move the material along the conduit in the direction in which the vibration tends to move the material.

References Cited by the Examiner
UNITED STATES PATENTS 3,031,064 4/62 Kline _____ 198—64 X
3,062,414 11/62 Morris _____ 222—199 X LOUIS J. DEMBO, *Primary Examiner.*

HADD S. LANE, RAPHAEL M. LUPO, *Examiners.*